United States Patent
Kuriyagawa et al.

(10) Patent No.: US 10,306,828 B2
(45) Date of Patent: Jun. 4, 2019

(54) LAWN MOWER POWERED BY CYLINDER DEACTIVATION ENGINE

(71) Applicant: HONDA MOTOR CO., LTD., Tokyo (JP)

(72) Inventors: Koji Kuriyagawa, Wako (JP); Hajime Yoshimura, Wako (JP); Norikazu Shimizu, Wako (JP); Shota Tanabe, Wako (JP); Tomohiro Miyauchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 91 days.

(21) Appl. No.: 15/459,046

(22) Filed: Mar. 15, 2017

(65) Prior Publication Data

US 2017/0265382 A1   Sep. 21, 2017

(30) Foreign Application Priority Data

Mar. 18, 2016 (JP) ................. 2016-054781

(51) Int. Cl.
| | |
|---|---|
| A01D 34/00 | (2006.01) |
| A01D 34/64 | (2006.01) |
| A01D 34/74 | (2006.01) |
| A01D 34/81 | (2006.01) |
| A01D 69/08 | (2006.01) |
| F02D 17/02 | (2006.01) |

(Continued)

(52) U.S. Cl.
CPC ........... *A01D 34/008* (2013.01); *A01D 34/64* (2013.01); *A01D 34/74* (2013.01); *A01D 34/81* (2013.01);
(Continued)

(58) Field of Classification Search
CPC .. A01D 34/006; A01D 34/008; A01D 34/828; A01D 34/64; A01D 34/74;
(Continued)

(56) References Cited

U.S. PATENT DOCUMENTS 5,123,234 A * 6/1992 Harada .............. A01D 34/6806
                                                                56/10.2 E
6,591,593 B1 * 7/2003 Brandon .............. A01D 34/006
                                                                56/10.6
(Continued)

FOREIGN PATENT DOCUMENTS

| EP | 2119337 A1 | 11/2009 |
|---|---|---|
| JP | 2007315455 A | 12/2007 |
| JP | 2009273386 A | 11/2009 |
| JP | 2013022987 A | 2/2013 |

OTHER PUBLICATIONS

Extended European Search Report for Application No. 17161045.4, dated Jul. 14, 2017, 8 pages.

*Primary Examiner* — Robert E Pezzuto
*Assistant Examiner* — Adam J Behrens
(74) *Attorney, Agent, or Firm* — Armstrong Teasdale LLP

(57) ABSTRACT

The lawn mower (10) comprises an internal combustion engine (100) having a plurality of cylinders, an engine control unit (110) for selectively deactivating at least one of the cylinders, a cutting blade (70) supported by a lawn mower main body via a cutter deck, and connected to the engine in a power transmitting relationship, a clutch (80) provided in a power transmission path between the engine and the cutting blade, a height adjustment mechanism (90) provided on the cutter deck for adjusting the height of the cutting blade, and a central control unit (50) for controlling an operation of the height adjusting mechanism, the clutch and the engine control unit. The central control unit is configured to cause the engine control unit to deactivate at least one of the cylinders when a prescribed operating condition is met, and to raise the cutting blade to a prescribed elevated height before deactivating the at least one of the cylinders.

5 Claims, 10 Drawing Sheets

(51) Int. Cl.
*F02D 41/00* (2006.01)
*F02D 29/02* (2006.01)
*A01D 101/00* (2006.01)

(52) U.S. Cl.
CPC ............. *A01D 69/08* (2013.01); *F02D 17/02* (2013.01); *F02D 29/02* (2013.01); *F02D 41/0087* (2013.01); *A01D 2101/00* (2013.01)

(58) Field of Classification Search
CPC .... A01D 34/81; A01D 2101/00; A01D 69/08; F02D 17/02; F02D 29/02; F02D 41/0087
See application file for complete search history.

(56) References Cited

U.S. PATENT DOCUMENTS

| | | | |
|---|---|---|---|
| 7,302,789 B2* | 12/2007 | Eavenson, Sr. | A01D 34/76 180/6.48 |
| 9,699,961 B2* | 7/2017 | Ito | A01D 34/006 |
| 9,845,739 B2* | 12/2017 | Fuentes Utrilla | A01D 34/006 |
| 2004/0163373 A1* | 8/2004 | Adams | A01D 34/006 56/10.2 R |
| 2008/0034721 A1 | 2/2008 | Waesche et al. | |
| 2011/0208405 A1* | 8/2011 | Tripathi | F02D 17/02 701/102 |
| 2012/0227368 A1* | 9/2012 | Koike | A01D 69/02 56/10.2 A |
| 2012/0231684 A1* | 9/2012 | Kuriyagawa | B63H 21/213 440/86 |
| 2015/0112574 A1* | 4/2015 | Koo | F02D 17/02 701/103 |
| 2016/0177844 A1* | 6/2016 | Fuentes Utrilla | A01D 34/006 701/110 |
| 2016/0295797 A1* | 10/2016 | Ito | A01D 34/006 |

\* cited by examiner

LAWN MOWER POWERED BY CYLINDER DEACTIVATION ENGINE

TECHNICAL FIELD

The present invention relates to a lawn mower provided with a multiple cylinder internal engine configured to selectively deactivate at least one of a plurality of cylinders.

BACKGROUND ART

JP2009-273386A discloses power equipment in the form of a ride-on mower which is provided with cutting blades housed in a cutter deck. The cutter deck can be adjusted vertically by manually operating a lever which is connected to the cutter deck via a linkage mechanism so that grass can be cut at a desired height. The cutting blades are rotated by the power of the engine.

JP2007-315455A discloses a lawn mower provided with a cutting blade housed in a blade housing. In this lawn mower, the blade is connected to the output shaft of the engine via an electromagnetic clutch. When a clutch switch is turned on by the operator, the control unit of the lawn mower engages the clutch if an increase in the engine rotational speed is detected, and disengages the clutch if a decrease in the engine rotational speed is detected. This operation is cyclically repeated so that the clutch can be finally engaged without stalling the engine.

JP2013-022987A discloses a ride-on mower provided with a cutting blade housed in a blade housing. The mower is provided with driven wheels which are powered by an internal combustion engine via a hydraulic continuous transmission system. The control system of the mower detects a steering operation of the mower, and reduces the speed of the driven wheels when a steering action of the mower is detected.

In power equipment having a propelling device (such as wheels and crawlers) and a work implement which are both powered by a same internal combustion, it is desirable to appropriately allocate the power to the propelling device and the work implement in such a way that the energy efficiency of the power equipment is optimized.

BRIEF SUMMARY OF THE INVENTION

In view of such problems of the prior art, and the recognition by the inventors, a primary object of the present invention is to provide power equipment which can minimize fuel consumption.

To achieve such an object, the present invention provides a lawn mower, comprising: a lawn mower main body (15) provided with a propelling device; a power source (100) for selectively powering the propelling device; a traveling state sensor (40) for detecting a traveling state of the lawn mower; an internal combustion engine (100) having a plurality of cylinders and supported by the lawn mower main body; an engine control unit (110) for selectively deactivating at least one of the cylinders; a cutting blade (70) rotatably supported by the lawn mower main body via a cutter deck (75) and connected to the engine in a power transmitting relationship; a blade clutch (80) provided in a power transmission path between the engine and the cutting blade; a height adjustment mechanism (90) provided on the cutter deck for adjusting a height of the cutting blade; and a central control unit (50) for controlling an operation of the blade clutch, the height adjustment mechanism and the engine control unit; wherein the central control unit is configured to cause the engine control unit to deactivate at least one of the cylinders when a prescribed operating condition is met, and to raise the cutting blade to a prescribed elevated height before deactivating the at least one of the cylinders.

Preferably, at least one of the cylinders of the engine may be deactivated when the engine load is light so that the fuel economy of the lawn mower may be improved. However, it is possible that the cutting blade may be operated at any time if the blade clutch is engaged, and this may suddenly increase the engine load. The central control unit should take such factors into account in determining the favorable timing for deactivating at least one of the cylinders of the engine.

On the other hand, the central control unit may also positively increase the likelihood of light engine load. For instance, the probability of encountering a heavy engine load can be positively decreased by raising the height of the cutting blade.

Based on such a consideration, according to the present invention, the central control unit is configured to cause the engine control unit to deactivate at least one of the cylinders when a prescribed operating condition is met, and to raise the cutting blade to a prescribed elevated height before deactivating the at least one of the cylinders. The probability of encountering a heavy engine load can be positively decreased by raising the height of the cutting blade.

According to a certain aspect of the present invention, the central control unit is configured to deactivate at least one of the cylinders when the lawn mower is not traveling forward.

When the lawn mower is not traveling forward, it is highly likely that the engine load is light. Therefore, it is advantageous to deactivate at least one of the cylinders when the lawn mower is not traveling forward in order to save fuel without any detrimental effect.

According to another aspect of the present invention, the central control unit is configured to maintain the cutting blade at the prescribed elevated height when the lawn mower is commanded to travel rearward or is traveling rearward.

When the lawn mower is commanded to travel rearward or is traveling rearward, no grass cutting is typically intended. Therefore, it is advantageous to maintain the cutting blade at the prescribed elevated height, and positively decrease the probability of a high engine load at such a time.

According to yet another aspect of the present invention, the lawn mower further comprises a steering angle sensor, and the central control unit is configured to deactivate at least one of the cylinders when the lawn mower is traveling forward, and a steering angle greater than a prescribed value is detected.

When the steering angle is great, it is highly probable that the lawn mower is being displaced from one place to another or making a U turn at an end of a mowing pass, and the engine load is light. Therefore it is advantageous to deactivate one of the cylinders to improve the fuel economy of the lawn mower at such a time.

According to yet another aspect of the present invention, when the lawn mower is traveling forward, and a steering angle greater than the prescribed value is detected, the central control unit further raises the cutting blade to a prescribed elevated height and decelerates the lawn mower.

By decelerating the lawn mower when a steering angle greater than a prescribed value is detected, the precision in the turning maneuver of the lawn mower can be improved and/or the turning radius of the lawn mower can be minimized.

According to yet another aspect of the present invention, the prescribed elevated height corresponds to a highest possible position of the cutter deck.

When the cutter deck is placed at the highest possible position, the likelihood for the cutting blade to encounter a high load can be minimized.

Thus, the present invention provides a lawn mower which can minimize fuel consumption.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
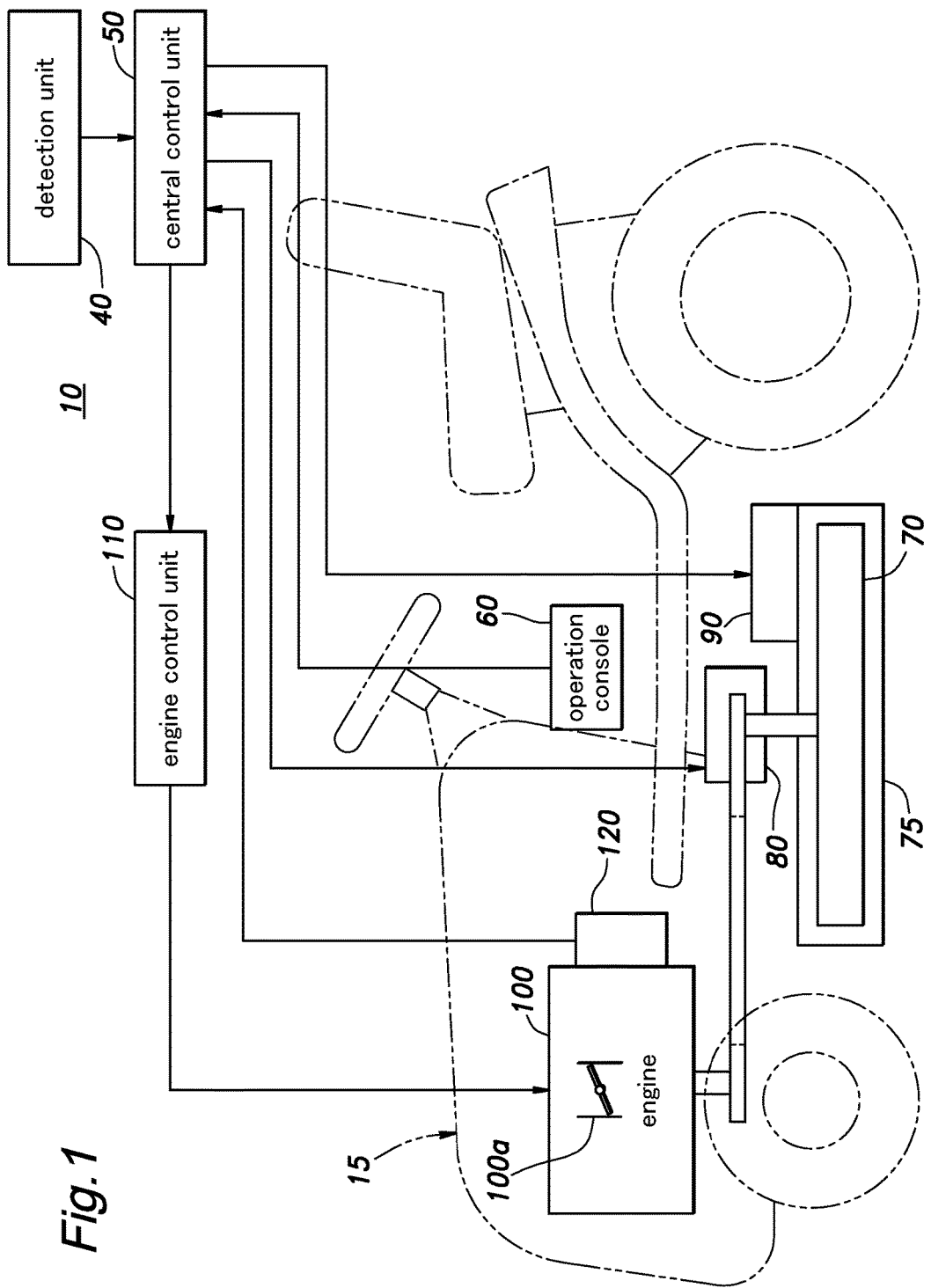
FIG. 1 is a functional block diagram of a ride-on lawn mower embodying the present invention.

Referring to FIG. 1, a ride-on lawn mower 10 embodying the present invention is provided with an internal combustion engine 100 consisting of a multiple cylinder engine (two-cylinder engine in the illustrated embodiment) supported in a front part of a lawn mower main body 15. A cutting blade 70 that can be rotatively actuated by the engine 100 is supported by a central lower part of the lawn mower main body 15. In the case of a lawn mower, as is the case with other forms of power equipment, the engine 100 is required to power not only the propelling device consisting of driven wheels but also the work implement consisting of a cutting blade 70; namely, in the illustrated embodiment, the engine 100 embodies both a power source for powering the propelling device and an internal combustion engine connected to the work implement in a power transmitting relationship. Therefore, in view of increasing the operation efficiency, high output engines typically consisting of multiple cylinder engines are preferred in most situations.

In the illustrated embodiment, the engine 100 is provided with a cylinder deactivation control device so that at least one of the cylinders may be selectively deactivated under a prescribed condition. The cylinder deactivation control device includes a central control unit 50 consisting of an electronic control unit, and an engine control unit 110 for controlling the operation of the engine 100. The engine control unit 110 may be either separately provided from the central control unit 50 or internally incorporated with the central control unit 50.

The central control unit 50 typically but not exclusively consists of a microcomputer including a CPU, ROM and RAM. The ROM stores a computer program (cylinder deactivation control program) for instructing the CPU to execute a series of actions (cylinder deactivation control process), and the RAM provides a work area for the CPU. The ROM also stores various data that are required for the CPU to operate.

The engine control unit 110 is configured to adjust the rotational speed of the engine 100 which may be incorporated with a throttle by wire system, and may be configured to perform the functions of an engine governor. The rotational speed of the engine may be given by revolutions per minute, "rpm", but may also be given by an inverse of time (in minutes) required for each revolution, "$min^{-1}$". The engine 100 is provided with a sensor unit 120 that includes an rpm sensor for detecting the rotational speed of the engine 100. The engine control unit 110 receives a target rotational speed from the central control unit 50, and controls the throttle valve 100a of the engine 100 so that the engine speed detected by the rpm sensor coincides with the target rotational speed.

The traveling speed of the lawn mower 10 can be controlled by the depression stroke of an accelerator pedal (not shown in the drawings). The depression stroke may be detected by a detection unit 40 equipped in the lawn mower 10. In the illustrated embodiment, the lawn mower 10 is equipped with a hydraulic transmission system which can be controlled by the accelerator pedal. However, other forms of transmission systems may also be used in the present invention. At any event, the traveling speed of the lawn mower 10 can be controlled by the depression stroke of the accelerator pedal under normal situations, but the central control unit 50 is able to change the traveling speed of the lawn mower 10 without regard to the depression stroke of the accelerator pedal.

The detection unit 40 further includes a speed sensor (which may consist of a wheel speed sensor) for detecting the traveling speed of the lawn mower 10. The lawn mower 10 is fitted with an operation console 60 which includes a start switch for starting the engine and a blade switch for selectively connecting the cutting blade with the output shaft of the engine in a torque transmitting relationship.

The cutting blade 70 is connected to the output shaft of the engine 100 via a blade clutch 80 consisting of an electromagnetic clutch.

The cutting blade 70 is rotatably supported by the blade deck 75 which is in turn attached to the lawn mower main body 15 via a height adjustment mechanism 90 including a linkage mechanism and an actuator (such as an electric motor). The blade deck 75 can be vertically adjusted by actuating the electric motor of the height adjustment mechanism 90 via the central control unit 50. This action may be performed both automatically and manually as required.

Figure 2:
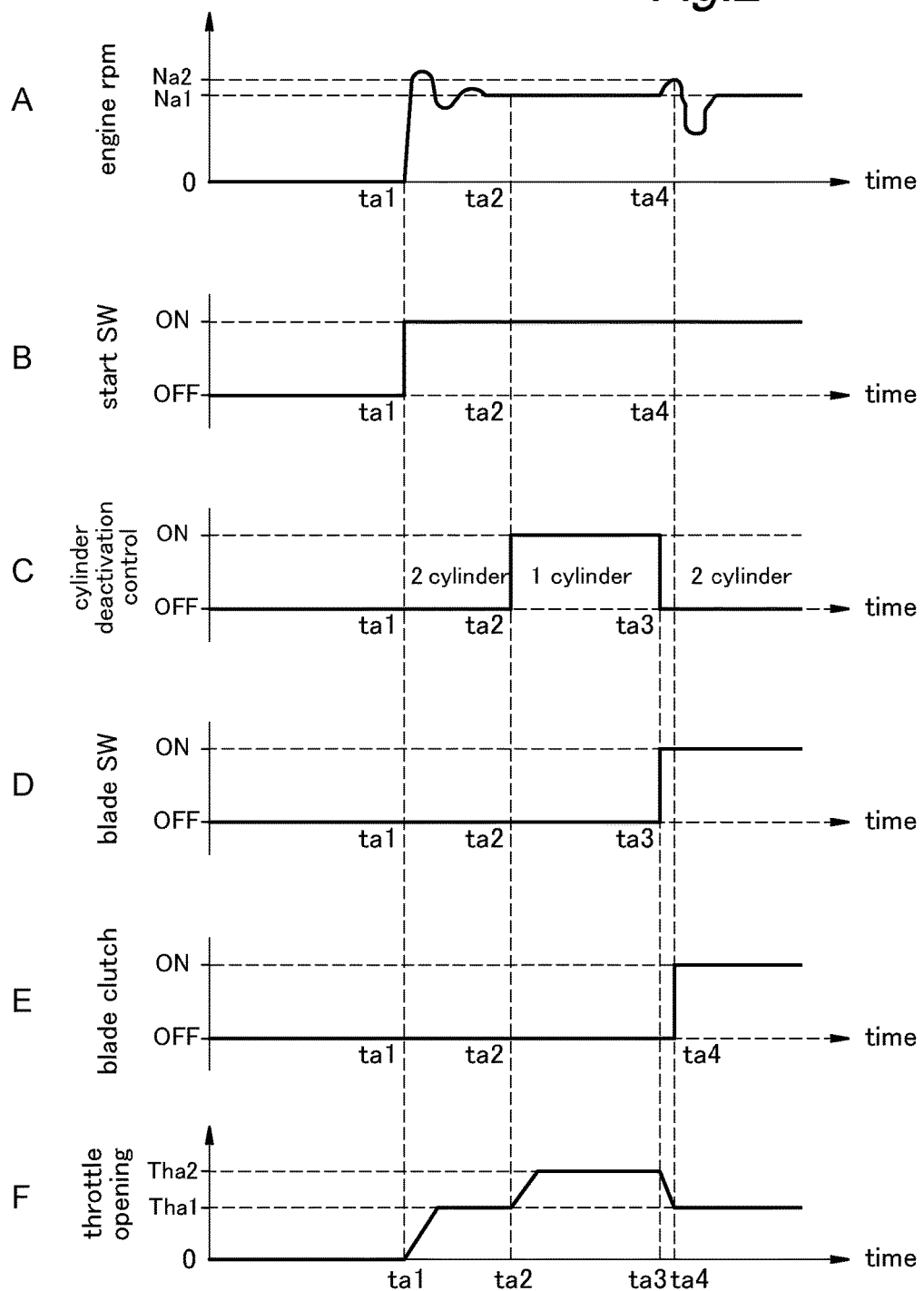
FIG. 2 is a time chart showing a first mode of operation of the mower.

FIG. 2 is a time chart showing a first mode of operation of the lawn mower 10. The operator starts the engine 100 at time ta1 by operating the start switch. The two cylinders are both in the activated condition at this time, and the throttle valve is opened gradually from a fully closed state to Tha1 (F in FIG. 3).

The central control unit 50 monitors the rotational speed of the engine 100, and monitors if the engine rotational speed is maintained at a prescribe speed Na1 in a stable manner (A in FIG. 2). Once the engine rotational speed has established a stable condition at speed Na1 at time ta2, the central control unit 50 deactivates one of the cylinders (C in FIG. 2) by controlling the engine control unit 110. At this time, in order to compensate for the deactivation of one of the cylinders, the throttle opening is increased to Tha2 (F in FIG. 2). At this time, the blade switch is still turned off (D in FIG. 2).

It is possible to start the engine with one of the cylinders deactivated. However, if the engine is started with only one of the cylinders activated, it would take longer for the engine rotational speed to reach a stable condition.

It is also possible to deactivate one of the cylinders as soon as the engine is started. However, again, if the engine is warmed up with only one of the cylinders activated, it would take longer for the engine rotational speed to reach a stable condition, and may impair the fuel economy of the engine owing to the prolonged period of instability in the engine rotational speed.

Based on such considerations, once the engine rotational speed is placed in a stable condition at speed Na1, the central control unit 50 deactivates one of the cylinders at time ta2 (C in FIG. 2). Thereby, the fuel economy of the engine can be improved. In other words, once the rotational speed of the engine 100 is placed in a stable condition, even with one of the cylinders deactivated, the rotational speed of the engine 100 can be continued to be in a stable condition at speed Na1.

Furthermore, as the engine 100 is started with the two cylinders activated at ta1, the time period required for the rotational speed of the engine 100 to reach a stable condition (the time interval between ta1 and ta2) can be minimized.

As the throttle opening is increased from zero to Tha1 by the central control unit 50 via the engine control unit 110, the rotational speed of the engine 100 quickly increases from zero, and initially overshoots speed Na1 to a significant extent (A in FIG. 2). The rotational speed then oscillates around speed Na1 for a certain time period. The central control unit 50 determines that the engine rotational speed has reached a stable condition once this oscillation has subsided to an acceptable level.

More specifically, the central control unit 50 determines if the rotational speed of the engine 100 is held within a tolerable range or determines if the rotational speeds of the engine 100 sampled at a prescribed time interval have converged into a tolerable range. The central control unit 50 determines that the rotational speed of the engine 100 is placed in a stable condition at time ta2, for instance, and starts the cylinder deactivation process at time ta2 (C in FIG. 2). This may be accomplished by defining a cylinder deactivation flag, and initiating the cylinder deactivation process when the cylinder deactivation flag is set to "1" instead of "0". At this time, the throttle opening is increased from Tha1 to Tha2 to maintain the same rotational speed Na1 with only one of the cylinders activated (F in FIG. 2).

During the time interval in which one of the cylinders is deactivated, the central control unit 50 monitors if the rotation of the cutting blade 70 is commanded. When the operator turns on the blade switch at time ta3, the central control unit 50 activates all of the cylinders (C and D in FIG. 2). This may be accomplished by setting the cylinder deactivation flag to "0" to terminate the cylinder deactivation process and activate all of the cylinders at time ta3.

Thus, the central control unit 50 keeps one of the cylinders deactivated until the operation of the cutting blade 70 is commanded, and activates all of the cylinders once data or a signal indicating the need for the operation of the cutting blade 70 is received from the operation console 60. Therefore, the consumption of fuel is reduced during the time period between time ta2 and time ta3.

In particular, when one of the cylinders is deactivated, the rotational speed of the engine is Na1. When the blade switch is turned on by the operator at time ta3, the central control unit 50 activates all of the cylinders, and increases the rotational speed of the engine to Na2 at the same time. Immediately following this, the central control unit 50 engages the blade clutch 80 at ta4.

According to this arrangement, when the cutting blade 70 is required to be operated, not only all of the cylinders are activated but also the rotational speed of the engine 100 is increased so that the sudden increase in the engine load caused by the engagement of the blade clutch 80 is prevented from causing the stalling of the engine 100 or otherwise placing the engine in an unstable condition. Therefore, during the operation of the mower 10, the possibility of stalling the engine 100 can be reduced without regard to the operating condition of the mower 10.

Once the blade clutch 80 is engaged, the central control unit 50 maintains all of the cylinders activated, and maintains the rotational speed of the engine at the normal rotation speed of Na1. Thus, by reducing the rotational speed of the engine from the high level of Na2 suitable for preventing the stalling of the engine to the normal level of Na1 once the blade clutch 80 is engaged, the engine 100 is made resistant against stalling while minimizing the fuel consumption.

The engine rotational speed sharply drops when the blade clutch 80 is engaged at time ta4 owing to the sudden increase in the engine load, but returns to the normal rotational speed of Na1 in a short period of time as the rotational speed of the cutting blade 70 stabilizes.

During the time interval between time ta2 and time ta3, the blade clutch 80 is disengaged while the mower 10 is stationary or traveling. Therefore, the engine load is so light that the engine may be operated with only one of the cylinders in an adequately stable manner. As a result, the fuel consumption can be minimized.

Preferably, when one of the cylinders is deactivated or during the time interval between time ta2 and time ta3, a highly lean mixture may be supplied to the combustion chamber of the active cylinder of the engine at a relatively wide throttle opening. In the illustrated embodiment, the throttle opening is increased from Th1 to Th2 at time ta2.

Thus, during the time interval between time ta2 and time ta3, the engine can be operated in a stable manner in spite of a highly lean mixture owing to the light load, and the increasing of the throttle opening reduces the pumping loss of the engine. As a result, the engine can be operated in a highly fuel efficient manner.

Furthermore, during the time interval between time ta2 and time ta3 or when one of the cylinders is deactivated, the ignition timing of the engine may be advanced and/or the duration of the spark of the spark plug may be increased so that a highly stable combustion may be maintained.

When the deactivated cylinder is activated once again at time ta3, the central control unit 50 returns the air fuel ratio back to the normal value, and reduces the throttle opening back to Tha1. In other words, the lean burn control is maintained during the time interval between time ta2 and time ta3, and is turned off at time ta3.

Figure 3:
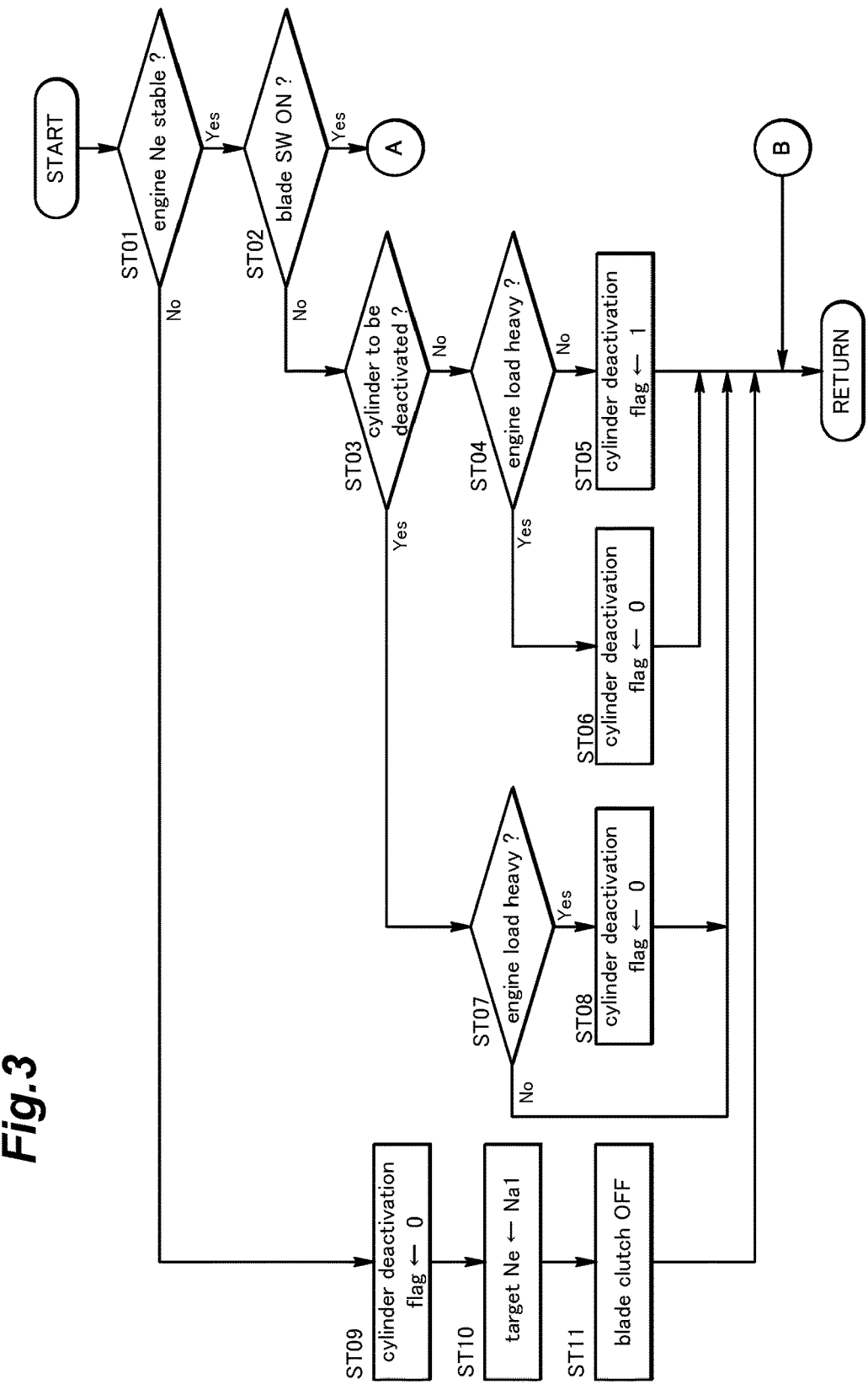
FIG. 3 is a flowchart showing the first mode of operation of the mower.
Figure 4:
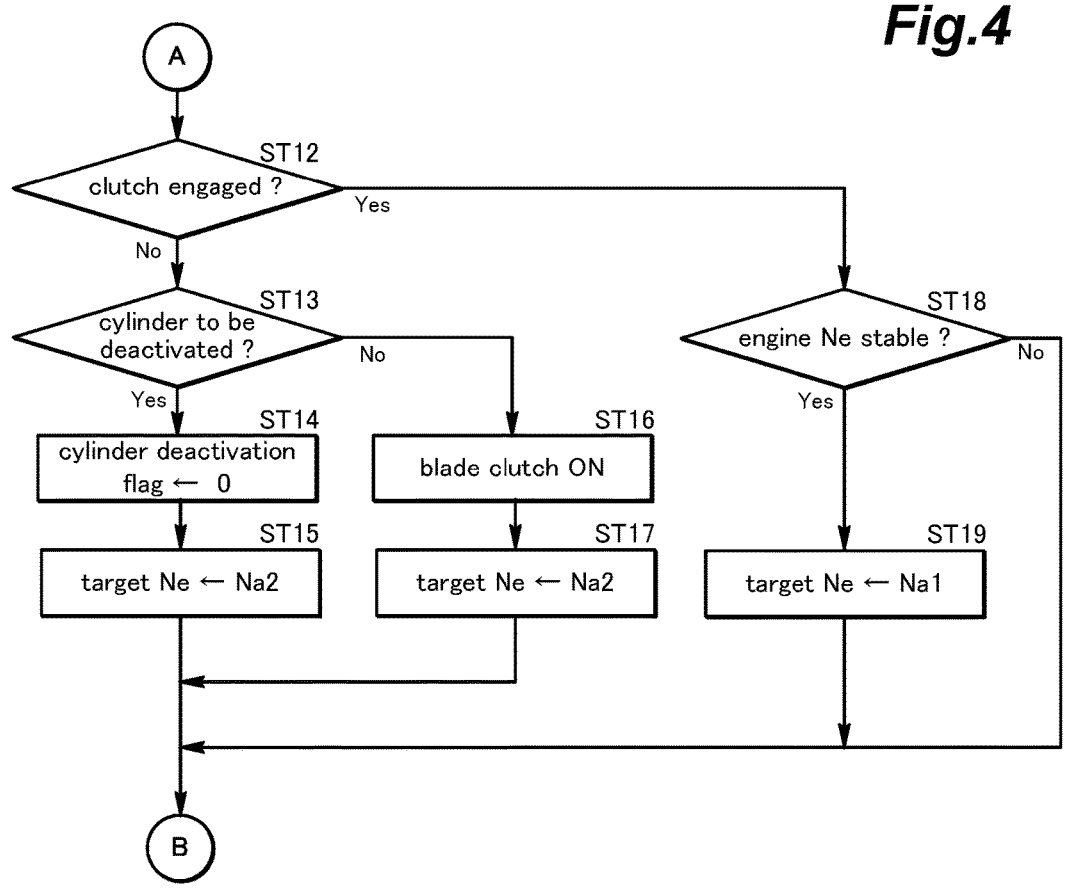
FIG. 4 is an additional part of the flowchart showing the first mode of operation of the mower.

FIGS. 3 and 4 show a flowchart of the mode of operation of the cylinder deactivation control from the time of engine start up. When the engine 100 is started, the central control unit 50 determines if the rotational speed of the engine 100 has stabilized at the rotational speed of Na1 in step ST01. If the rotational speed of the engine 100 has stabilized at the rotational speed of Na1, the central control unit 50 monitors if the blade switch on the operation console 60 has been turned on in step ST02.

If the blade switch is turned off in step ST02, the central control unit 50 determines if the cylinder deactivation process is to be started according to the cylinder deactivation flag in step ST03. The cylinder deactivation flag is initially set to "0". If the cylinder deactivation flag is "0" in step ST03, the central control unit 50 determines if the load of the engine 100 is heavy in step ST04.

More specifically, if the throttle opening is constant or in a stable condition, and additionally or alternatively, if the throttle opening is below a prescribed threshold value, the determination result of step ST04 is No. The sensor unit 120 is provided with a throttle sensor for this purpose.

If the engine load is light in step ST04, the cylinder deactivation flag is set to or maintained at "1" in step ST05. Conversely if the engine load is heavy in step ST04, the cylinder deactivation flag is set to or maintained at "0" in step ST06. Then, in either case, the program flow returns to step ST01.

If the cylinder deactivation flag is "1" in step ST03, the central control unit 50 determines if the load of the engine 100 is heavy in step ST07. This determination step is similar to step ST04, and it is determined that the engine load is light if the throttle opening is constant or in a stable condition, and additionally or alternatively, if the throttle opening is below a prescribed threshold value.

If the engine load is light in step ST07, the cylinder deactivation flag is maintained at "1". Conversely if the engine load is heavy in step ST07, the cylinder deactivation flag is set to "0" in step ST08, and the program flow returns to step ST01.

If the rotational speed Ne of the engine 100 is not stable in step ST01, the cylinder deactivation flag is set to or maintained at "0" in step ST09, and the target rotational speed of the engine 100 is set to a prescribed rotational speed Na1 in step ST10. The target rotational speed of the engine 100 is initially (when the engine 100 is started) set to the prescribed rotational speed Na1. The blade clutch 80 is then disengaged (OFF) or maintained in the disengaged state in step ST11, and the program flow returns to step ST01. The blade clutch 80 is initially (when the engine is started) disengaged.

If the blade switch is turned on in step ST02, the central control unit 50 determines if the blade clutch 80 is engaged in step ST12. If the blade clutch 80 is disengaged, step ST13 similar to step ST03 is executed to determine if the cylinder deactivation process is to be started.

If the cylinder deactivation flag is "1" in step ST13, the cylinder deactivation flag is set to "0" in step ST14, and the target rotational speed of the engine 100 is set to Na2 which is higher than the prescribed rotational speed Na1 in step ST15. If the cylinder deactivation flag is "0" in step ST13, the central control unit 50 automatically engages the blade clutch 80 in step ST16. Step ST17 similar to step ST15 is then executed to set the target rotational speed Ne of the engine 100 to Na2. Following steps ST15 and ST17, the program flow returns to step ST01.

If the blade clutch 80 is engaged in step ST12, the central control unit 50 determines if the rotational speed Ne of the engine 100 is maintained at Ne2 in a stable manner in step ST18. If the rotational speed Ne of the engine 100 is maintained at Ne2 in a stable manner in step ST18, the central control unit 50 then sets the target rotational speed to the prescribed rotational speed Na1 in step ST19, and the program flow returns to step ST01. If the rotational speed is not stable in step ST18, the program flow returns to step ST01.

Figure 5:
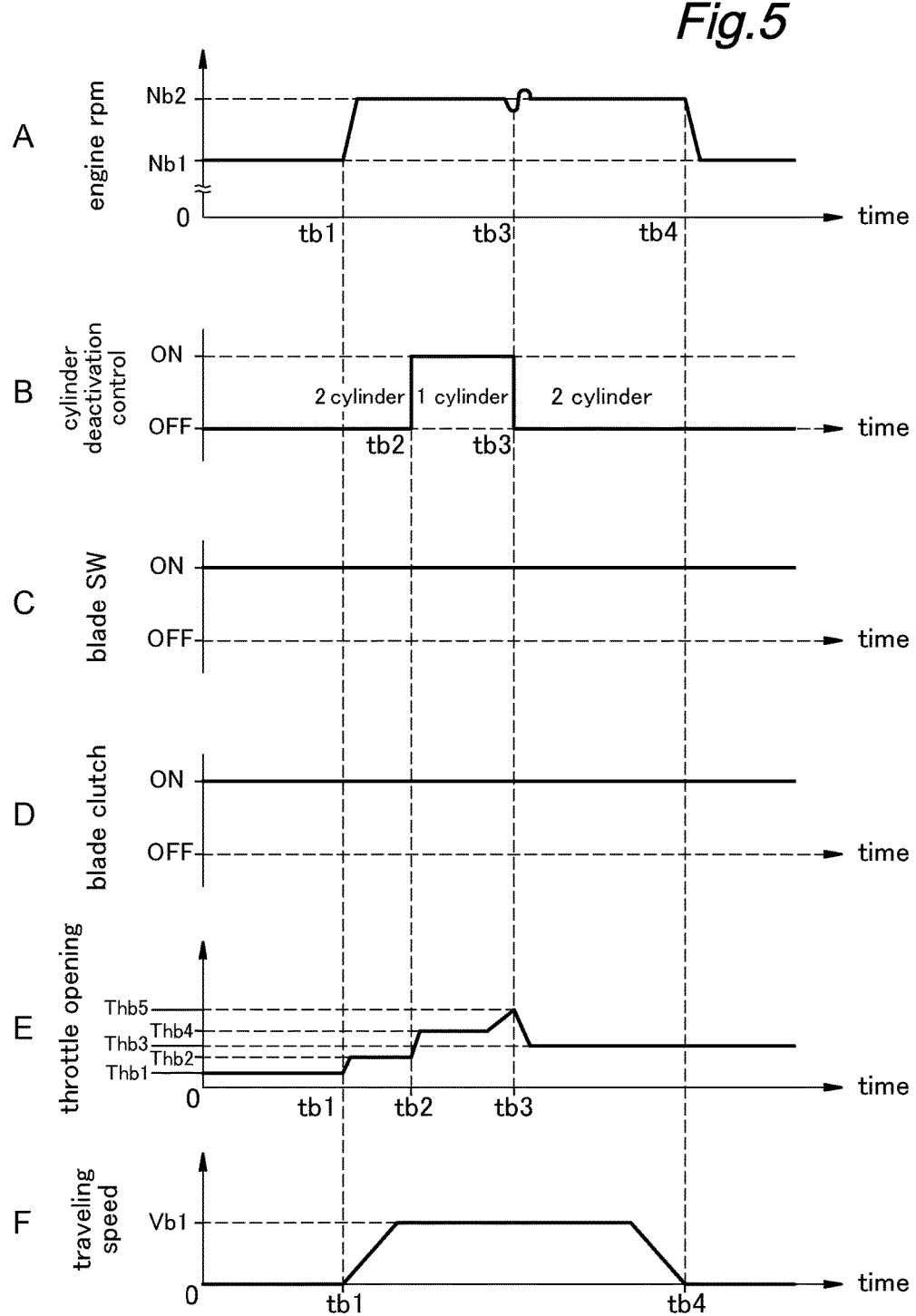
FIG. 5 is a time chart showing a second mode of operation of the mower.

FIG. 5 is a time chart showing the mode of operation of the lawn mower 10 including the time point of starting a forward travel with the blade clutch 80 already placed in the engaged state and the engine 100 running. The throttle opening was initially Thb1, and the operator increases the throttle opening to Thb2 at time tb1 (E in FIG. 5). This causes the lawn mower 10 to start traveling forward at time tb1 (F in FIG. 5).

The detection unit 40 detects the traveling speed of the lawn mower 10, and the central control unit 50 maintains the traveling speed of the lawn mower 10 at Vb1 which is greater than zero. At this time, because of the high loading placed on the engine 100, the two cylinders are kept activated so that the rotational speed of the engine 100 may be maintained at Nb2 in spite of the added loading required for propelling the lawn mower 10.

If the cutting blade 70 does not cut grass while the lawn mower 10 is traveling forward, it is possible to deactivate one of the cylinders. However, as the blade clutch 80 is engaged, it is very possible that the cutting blade 70 starts cutting grass. Therefore, it is advantageous to keep both of the two cylinders activated when the lawn mower 10 has started traveling forward, and to continue to keep the two cylinders activated until the operating condition of the engine 100 has stabilized (B in FIG. 5).

While the two cylinders are kept activated, following the time point tb1, the central control unit 50 monitors if the throttle opening is smaller than a prescribed level Thb3. If a throttle opening smaller than Thb3 has persisted for more than a prescribed time period, the central control unit 50 deactivates one of the cylinders at time tb2 so that the fuel consumption may be saved (B and E in FIG. 5).

The fact that the throttle opening is smaller than Thb3 means that the loading of the engine 100 is light even though the cutting blade 70 is rotating. Therefore, the central control unit 50 can safely deactivate one of the cylinders at time tb2. Thus, at this time, the central control unit 50 sets the cylinder deactivation flag to "1" at time tb2 to initiate the cylinder deactivation control, and the engine 100 is operated with only one of the cylinders activated. At the same time, the throttle opening is increased to Thb4 which is greater than Thb3 so that the rotational speed of Nb2 may be maintained with only one of the cylinders activated.

Following the time point tb2, the central control unit 50 continues to monitor the throttle opening if the throttle opening is greater than a prescribed opening Thb5 which is higher than Thb4. If the throttle opening exceeds this threshold level Thb5, the central control unit 50 causes the engine 100 to operate with both of the cylinders activated at tb3 (B and E in FIG. 5). Thus, at this time, the central control unit 50 sets the cylinder deactivation flag to "0" at time tb3 to interrupt the cylinder deactivation control, and the engine 100 is operated with both of the cylinders activated.

Thus, when the engine loading is high (as detected by the throttle opening exceeding Thb5), both of the cylinders are activated so that the engine 100 is prevented from stalling or otherwise being placed in an unstable condition. In other words, both of the cylinders are activated when the power requirement of the engine is high (such as when the cutting blade 70 is cutting grass while the lawn mower 10 is traveling forward) but until such a time, the engine is allowed to operate with only one of the cylinders activated so that the fuel consumption can be minimized.

Alternatively, following the time point tb2, the central control unit 50 monitors if the rotational speed of the engine 100 is maintained at Nb2 in a stable manner. If the throttle opening exceeds Thb5 while the rotational speed of the engine 100 is not stable at Nb2, the central control unit 50 interrupts the cylinder deactivation control, and causes both of the cylinders to be activated at time tb3.

More specifically, the central control unit 50 determines if the rotational speed of the engine 100 remains in a prescribed tolerance range, or if the rotational speed of the engine 100 is within the tolerance range such as Nb2±ΔN at each sampling time Δt. If the central control unit 50 determines that the engine rotational speed is not stable at time tb3, the cylinder deactivation control is interrupted at time tb3.

Thus, the loading of the engine is determined from the fluctuations in the engine rotational speed and the throttle opening in a highly exact manner so that the cylinder deactivation control is interrupted only when required. As a result, the cylinder deactivation control is kept turned on whenever possible, and the fuel consumption of the engine can be minimized.

Following the time point tb3, the central control unit 50 determines if the lawn mower 10 is still traveling forward. When a zero speed of the lawn mower 10 is detected by the detection unit 40 at time tb4, the central control unit 50 can determine that the lawn mower 10 has come to a stop at time tb4 (F in FIG. 5). At this time point, the central control unit 50 may continue to activate both of the cylinders from this time point tb4 onward so that the lower rotational speed Nb1 (which is lower than Nb2) of the engine 100 may be regained in stable manner.

Once the lawn mower 10 has come to a stop, even though the blade clutch 80 may be engaged, it can be assumed that the engine load is light. Therefore, the central control unit 50 lowers the rotational speed of the engine to Nb1 so that the fuel consumption may be minimized.

During the time interval between tb2 and tb3, only one of the cylinders is activated while the rotational speed of the engine is maintained at Nb2 so that the fuel consumption may be minimized.

Preferably, when one of the cylinders is deactivated or during the time interval between time tb2 and time tb3, a highly lean mixture may be supplied to the combustion chamber of the active cylinder of the engine at a relatively wide throttle opening. In the illustrated embodiment, the throttle opening is increased from Thb2 to Thb4 at time tb2. More specifically, the central control unit 50 makes the fuel/air ratio leaner by adjusting the amount of fuel injection for the given air intake via the engine control unit 110 while the throttle opening is increased from Thb2 to Thb4 at time tb2.

Thus, during the time interval between time tb2 and time tb3, the engine 100 can be operated in a stable manner in spite of a highly lean mixture owing to the light load, and the increasing of the throttle opening reduces the pumping loss of the engine. As a result, the engine can be operated in a highly fuel efficient manner.

Furthermore, during the time interval between time tb2 and time tb3 or when one of the cylinders is deactivated, the ignition timing of the engine may be advanced and/or the duration of the spark of the spark plug may be increased so that a highly stable combustion may be maintained.

When the cylinder deactivation control is interrupted, and both of the cylinders are activated, the central control unit 50 changes the air fuel ratio from a lean value to a normal or stoichiometric value while automatically closing the throttle opening from Thb5 to Thb3. In other words, the central control unit 50 terminates the lean burn control at time tb3.

Figure 6:
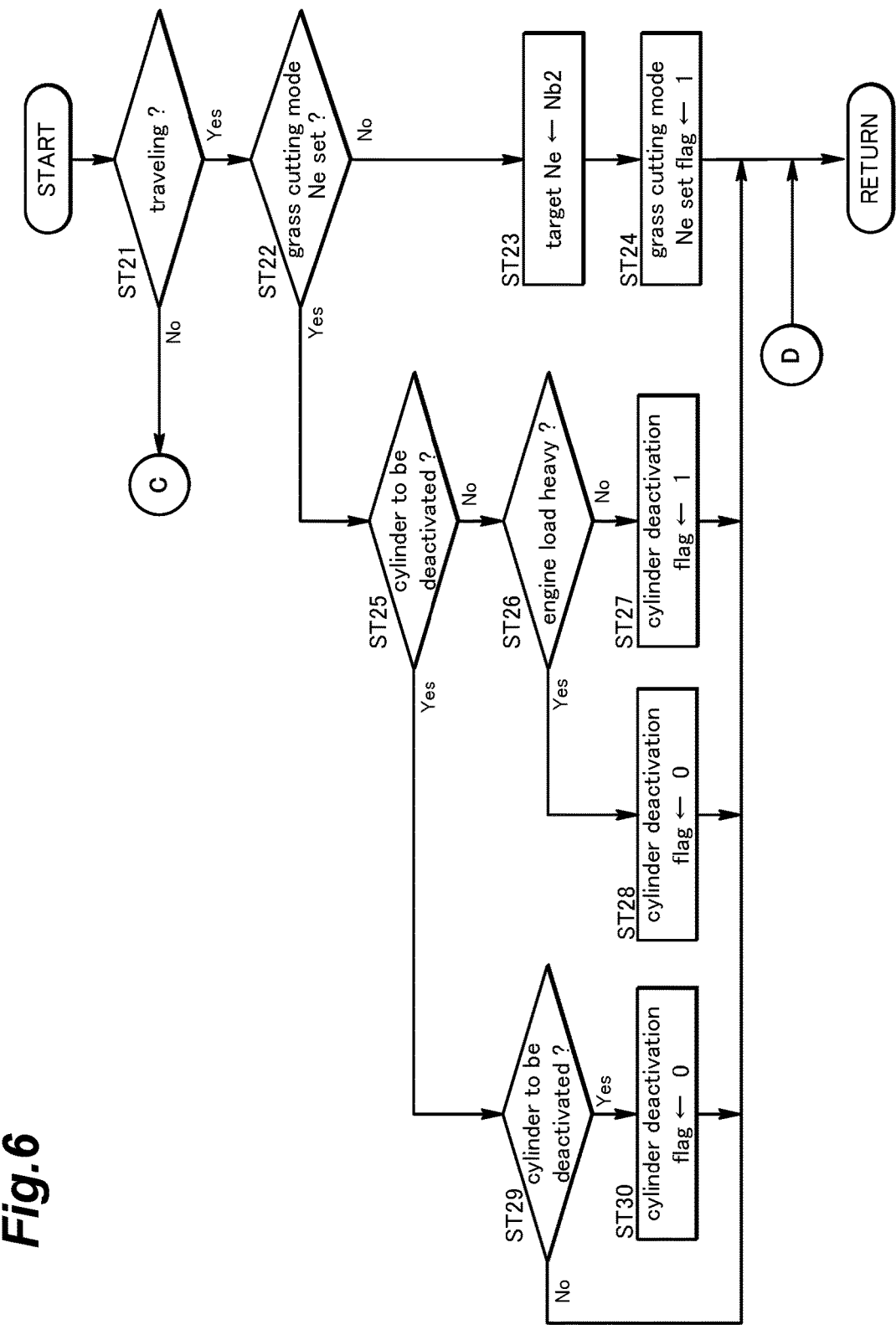
FIG. 6 is a flowchart showing the second mode of operation of the mower.
Figure 7:
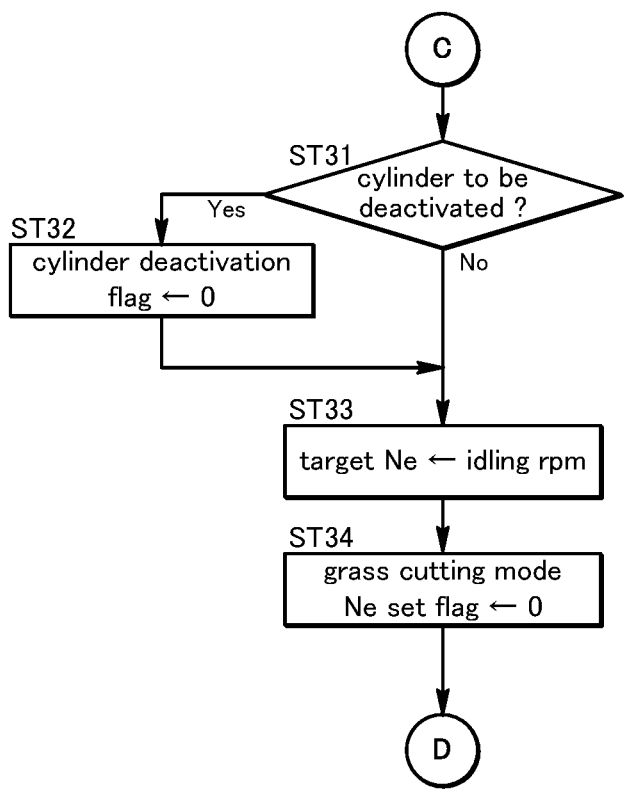
FIG. 7 is an additional part of the flowchart showing the second mode of operation of the mower.

FIGS. 6 and 7 show a flowchart of the cylinder deactivation control process including the starting of the forward travel of the lawn mower 10. It should be noted that this is only exemplary, and does not limit the scope of the present invention. After the blade switch is turned on by the operator, and the blade clutch 80 is engaged as a result, the central control unit 50 determines if the lawn mower 10 is moving forward or not according to the data or signal supplied by the detection unit 40 which may include a wheel speed sensor (step ST21).

When the lawn mower 10 is traveling forward, the central control unit 50 determines if a target rotational speed of the engine 100 is set at a target rotational speed Nb2 for a grass cutting condition according to a grass cutting mode Ne set flag (step ST22). Initially or once the blade clutch 80 is engaged, the grass cutting mode Ne set flag is set to "0".

When the grass cutting mode Ne set flag is set to "0", the central control unit 50 sets or raises the target rotational speed to Nb2 (step ST23). Initially or once the blade clutch 80 is engaged, the target rotational speed is set to an idling target rotational speed Nb1 (a non-grass cutting condition). However, as the mass of the lawn mower is significant particularly in the case of a ride-on mower, the target rotational speed should be increased to the higher value of Nb2 in order to avoid the stalling of the engine at the time of start off. Then, the central control unit 50 sets the grass cutting mode Ne set flag to "1" (step ST24), and the program flow returns to step ST21.

If the grass cutting mode Ne set flag is to "1" in step ST22, and the rotational speed Ne of the engine 100 is therefore set to the prescribed rotational speed Nb2, the central control unit 50 determines if the cylinder deactivation control is to be initiated by referring to the cylinder deactivation flag indicating whether the cylinder deactivation control is to be initiated or not (step ST25). The cylinder deactivation flag is initially set to "0".

If the cylinder deactivation flag is "0" in step ST25, the central control unit 50 determines if the load on the engine 100 is high (step ST26). More specifically, the load on the engine 100 is determined to be not high when the throttle opening persists to be below the prescribed opening Thb3 for a prescribed time period.

If the load on the engine 100 is not high in step ST26, the central control unit 50 sets the cylinder deactivation flag to "1" (step ST27). On the other hand, if the load on the engine 100 is high in step ST26, the central control unit 50 sets the cylinder deactivation flag to "0" or maintains the cylinder deactivation flag at "0" (step ST28).

When the cylinder deactivation flag is set to "1" in step ST25, the central control unit 50 determines if the cylinder deactivation control is to be terminated (step ST29). More specifically, the central control unit 50 terminates the cylinder deactivation control if the throttle opening is greater than a value Thb5 which is higher than the prescribed opening value Thb3. Alternatively, the central control unit 50 may terminate the cylinder deactivation control on the condition that the throttle opening is greater than the high value Thb5, and the rotationally speed of the engine does not stay stable at the prescribed rotational speed Nb2.

When the cylinder deactivation control is terminated in step ST29, the central control unit 50 sets the cylinder deactivation flag to "0" (step ST30). Otherwise, the program flow returns to step ST21. If the traveling speed of the lawn mower is zero or if the lawn mower is stationary in step ST21, the central control unit 50 executes step ST31 in a similar manner as in step ST25.

When the cylinder deactivation flag is "1" in step ST31, the central control unit 50 sets the cylinder deactivation flag to "0" (step ST32). Typically, when the traveling speed of the lawn mower 10 is zero, both of the cylinders are activated as shown in B and F of FIG. 5. However, the lawn mower 10 may come to a stop (the traveling speed of the lawn mower may become zero) while one of the cylinders is deactivated. It may also be configured such that, under such a circumstance, the cylinder deactivation flag may be set to "1" in step ST31.

When the cylinder deactivation control is not detected in step ST31 or when cylinder deactivation flag is set to "0" step ST32, the central control unit 50 sets the target rotational speed of the engine to the idling rotational speed Nb1 or maintains the idling rotational speed Nb1 (step ST33). The central control unit 50 then sets the grass cutting mode Ne set flag to "0" or maintains this flag at "0" (step ST34). Then, the program flow eventually returns to step ST21.

Figure 8:
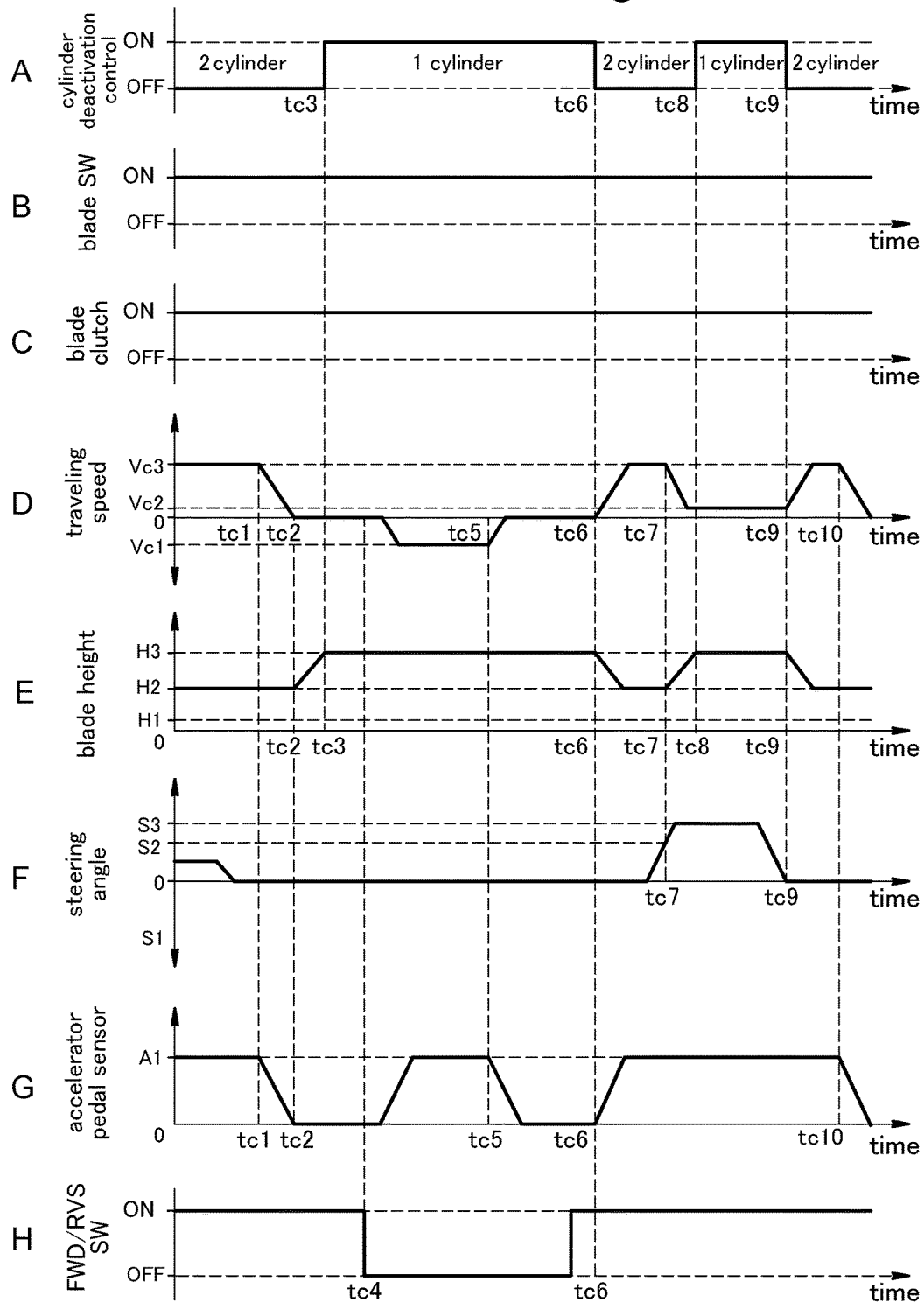
FIG. 8 is a time chart showing a third mode of operation of the mower.

FIG. 8 is a time chart showing the mode of operation of the lawn mower 10 including time periods where the lawn mower is traveling forward, stationary and traveling rearward. While the blade clutch 80 is engaged by the operator by turning on the blade switch provided on the operation console 60, the lawn mower 10 which has been traveling forward at speed Vc3 is brought to a stop at time tc2. The detection unit 40 shown in FIG. 1 detects the traveling speed of the lawn mower 10, and then sends a signal or data indicating the stationary condition of the lawn mower 10 to the central control unit 50 at time tc2.

The fact that the lawn mower 10 is stationary typically indicates that the load on the engine 100 is light. However, it is also possible that the engine load is high because the blade clutch 80 is engaged, and the cutting blade 70 may be mowing grass. Therefore, the central control unit 50 still keeps both of the cylinders activated at time tc2.

Then, the central control unit 50 evaluates the probability of the engine encountering a high load after time tc2. If the probability of a light engine load is high following time tc2, the central control unit 50 deactivates one of the cylinders.

The probability of the engine load being light can be positively increased according to the present invention. For instance, the height of the cutting blade 70 can be automatically increased from a normal height H2 to a highest possible height H3 at time tc2 by using the height adjustment mechanism 90 for adjusting the height of the blade deck. This is accomplished by setting a blade height control flag to "1".

The higher the cutting blade 70 is, the smaller the cutting load of the cutting blade 70 becomes. When the blade deck 75 is placed in the highest position, the cutting blade 70 typically does not cut grass at all. When the cutting blade 70 is higher than the expected height of the grass, the cutting blade 70 consumes substantially no power of the engine or, in other words, the probability of a light engine load is high.

Thus, the central control unit 50 initiates the cylinder deactivation control at time tc3, and deactivates one of the cylinders. In other words, when the blade clutch 80 is engaged, and both of the cylinders are activated, the central control unit 50 determines that the cylinder deactivation control should be initiated, optionally, after raising the height of the cutting blade to the highest possible position H3.

More specifically, the central control unit 50 determines at time tc2 if the lawn mower 10 continues to travel forward or has come to a stop. If the lawn mower 10 has come to a stop, the central control unit 50 automatically raises the cutting blade 70 from height H2 to height H3 during the time period of from tc2 to tc3, and initiates the cylinder deactivation control at time tc3 (A, D and E in FIG. 8).

Then, suppose that the operator operates a transmission lever (forward/reverse switch) on the operation console 60 to command the central control unit 50 to put the gear in the reverse. The central control unit 50 detects the selection made by the transmission lever at time tc4 (F in FIG. 8).

As a result, the lawn mower 10 starts traveling rearward, and a signal or data indicating the rearward movement is forwarded from the detection unit 40 to the central control unit 50 (D in FIG. 8). During the time interval between tc2 and tc6 where the lawn mower 10 is not traveling forward, or, in other words, where the lawn mower 10 is stationary or traveling rearward, the central control unit 50 maintains the cutting blade 70 at height H3 (E in FIG. 8).

The operator then decides to drive the lawn mower 10 forward at time tc6, and the central control unit 50 receives a signal or data indicating a forward speed greater than zero from the detection unit 40 at time tc6 (D in FIG. 8). At this point or time tc6, the central control unit 50 terminates the cylinder deactivation control, and activates both of the cylinders (A in FIG. 8). At the same time, the central control unit 50 sets the blade height control flag to "0" so that the height of the cutting blade 70 is lowered from H3 to H2 (E in FIG. 8).

The central control unit 50 sets the blade height control flag to "0" at time tc6, and automatically lowers the height of the blade 70 from H3 to H2 (E in FIG. 8). The central control unit 50 then determines that the lawn mower 10 is steered to the right at time tc7 with a steering angle exceeding a prescribed threshold value S2 (F in FIG. 8). The central control unit 50 detects the right turn of the lawn mower 10 via a steering angle sensor included in the detection unit 40.

When a large steering angle is detected, it is highly likely that the lawn mower 10 is being relocated from one location to another or making a U turn at a perimeter of the lawn so that the probability of the engine load being light is high. Therefore, when a large steering angle (exceeding S2) is detected, the central control unit 50 raises the height of the cutting blade 70 from H2 to H3 at time tc7, and, upon the cutting blade 70 reaching the height H3 at time tc8, initiates the cylinder deactivation control at time tc8 (A, E and F in FIG. 8).

Also, upon detecting that the steering angle has exceeded the threshold value S2 at tc7, not only the height of the cutting blade 70 is raised to H3 but also the traveling speed of the lawn mower 10 is automatically reduced from Vc3 to Vc2 (D in FIG. 8) by setting a steering speed reduction flag to "1" at time tc7. By thus automatically reducing the traveling speed of the lawn mower 10, the precision of the turning maneuver of the lawn mower 10 can be improved, and/or the turning radius of the lawn mower 10 can be minimized.

In the illustrated embodiment in which a throttle by wire system is incorporated in the engine 100, when the steering speed reduction flag is set to "1", the central control unit 50 causes the traveling speed of the lawn mower 10 to be automatically reduced from Vc3 to Vc2 via the engine control unit 110. Alternatively or additionally, the central control unit 50 may apply a brake to the lawn mower 10 to achieve the required speed reduction.

If the lawn mower 10 consists of a hybrid lawn mower 10 which uses an electric motor as a power source for powering the propelling device of the lawn mower and an internal combustion engine for driving the cutting blade 70, the central control unit 50 can reduce the traveling speed of the lawn mower by suitably controlling the electric power supplied to the electric motor.

Once the cutting blade 70 has been raised to the height of H3 at time tc8, the central control unit 50 initiates the cylinder deactivation control (A and E in FIG. 8). When the steering angle is reduced to zero at tc9, and the lawn mower 10 has thereby started traveling forward, the central control unit 50 terminates the cylinder deactivation control, and activates both of the cylinders (A and F in FIG. 8). This is advantageous because, typically, once the lawn mower 10 has started traveling straight forward, the cutting blade 70 is required to cut grass, and it is therefore highly likely that the engine load will increase.

Figure 9:
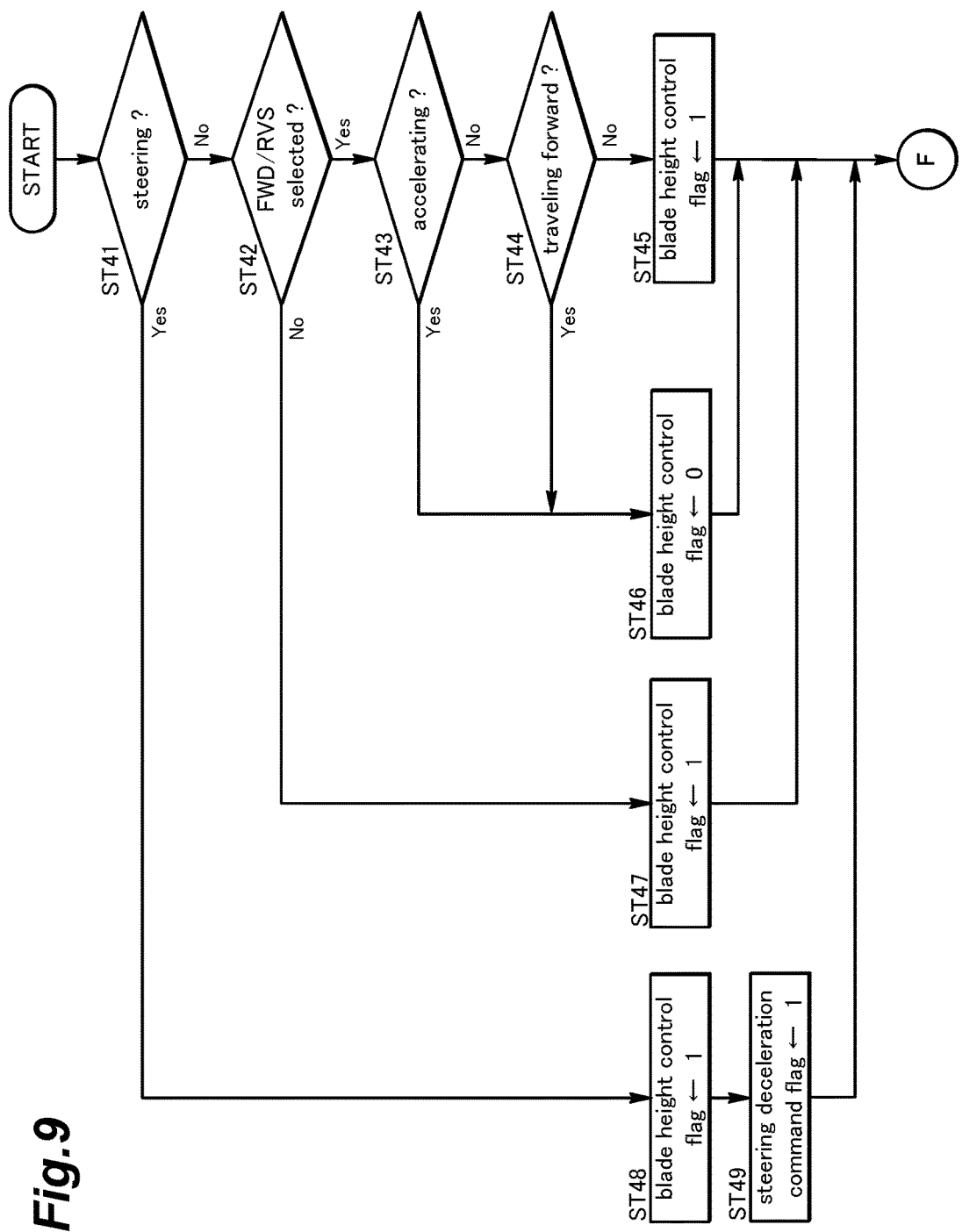
FIG. 9 is a flowchart showing the third mode of operation of the mower.
Figure 10:
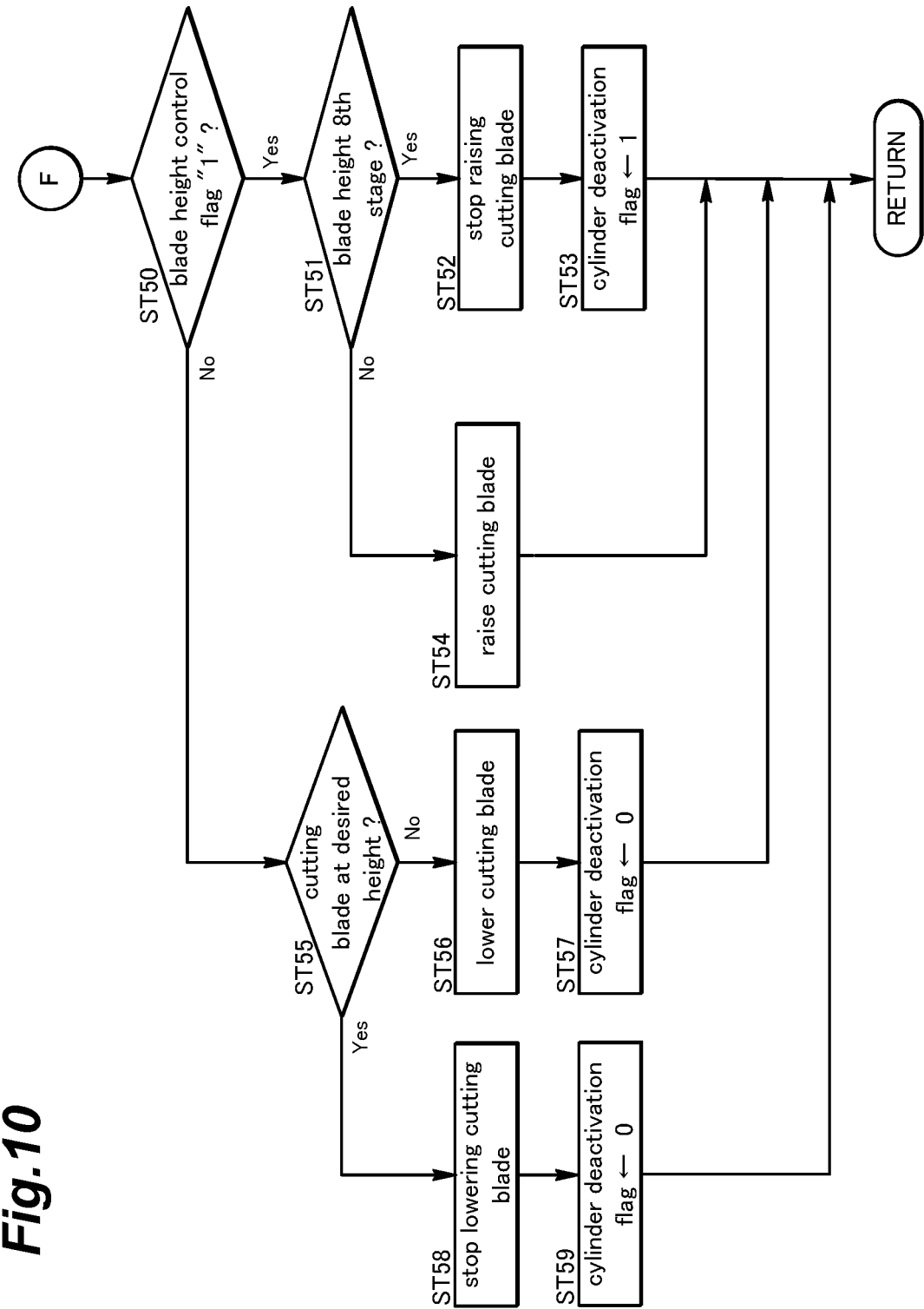
FIG. 10 is an additional part of the flowchart showing the third mode of operation of the mower.

FIGS. 9 and 10 show a flowchart illustrating the mode of operation of the lawn mower 10 during a time interval in which the traveling direction of the lawn mower 10 is reversed, and the lawn mower 10 is steered by a relatively large angle. Suppose that the blade clutch 80 is initially engaged. The central control unit 50 determines if the lawn mower 10 is steered by detecting a steering angle exceeding the prescribed threshold value S2 according to a signal or data obtained from the detection unit 40 (step ST41).

More specifically, when the absolute value of the steering angle is smaller than the threshold value S2, the central control unit 50 determines if the transmission system of the lawn mower 10 is placed in the state for the forward movement according to the data or signal from the FWD/RVS switch in the operation console 60 (step ST42).

Upon detecting the state for the forward movement of the lawn mower 10, the central control unit 50 determines if the lawn mower 10 is being accelerated according to the data or signal from the detection unit 40 which may include an accelerator pedal sensor (step ST43). More specifically, the central control unit 50 determines that the lawn mower 10 is not accelerating when the depression stroke of the accelerator pedal is zero, and that the lawn mower 10 is accelerating when the depression stroke of the accelerator pedal is not zero.

Upon detecting that the lawn mower 10 is not accelerating, the central control unit 50 determines if the lawn mower 10 is traveling forward from the data or signal from the detection unit 40 which may include a wheel speed sensor (step ST44). More specifically, the central control unit 50 determines that the lawn mower 10 is not traveling forward when the wheel speed is zero, and that the lawn mower 10 is traveling forward when the wheel speed is not zero.

When the traveling speed of the lawn mower is zero, the central control unit 50 sets the blade height control flag to "1" (step ST45). In the initial condition or when the blade clutch 80 is engaged, the blade height control flag is set to "0".

If the lawn mower 10 is accelerating in step ST43, the blade height control flag is set to or maintained at "0" (step ST46). Similarly, if the traveling speed of the lawn mower 10 is not zero in step ST44, the blade height control flag is set to or maintained at "0" (step ST46).

If the transmission system of the lawn mower 10 is not in the state for forward travel in step ST42, the blade height control flag is set to "1" (step ST47). Similarly, if the absolute value of the steering angle is greater than the prescribed threshold value S2, the blade height control flag is set to "1" (step ST48).

Then, the central control unit 50 may set the steering deceleration command flag to "1" (step ST49). Initially or when the blade clutch 80 is engaged, the steering deceleration command flag is set to "0". When the deceleration during the cornering maneuver is completed, the central control unit 50 sets the steering deceleration command flag back to "0".

The central control unit 50 determines if the blade height control flag is "1" in step ST50. If the blade height control flag is "1", the central control unit 50 sets the height of the blade 70 to the highest position H3 or the eighth stage (step ST51). More specifically, the central control unit 50 keeps moving the blade deck 75 upward while monitoring the data or signal from the height adjustment mechanism 90 until the highest position H3 (eighth stage) is reached (step ST52). Once the blade 70 has reached the highest position, the blade height control flag is set to "0".

At the same time, the central control unit 50 sets the cylinder deactivation flag to "1" (step ST53). In the initial condition or when the blade clutch 80 is engaged, the cylinder deactivation flag is set to "0".

If the blade height has not reached the highest position or the signal received from the height adjustment mechanism 90 indicates that the blade height is lower than the highest position H3 (in the seventh stage or lower) in step ST51, the central control unit 50 moves the blade deck 75 upward by one stage (step ST54).

If the blade height control flag is not "1" in step ST50, the central control unit 50 determines if the height of the blade 70 should be set to a desired height (such as the fourth stage) according to the setting entered from the operation console 60 by the operator (step ST55).

For instance, when the current blade height is in the highest position (the eighth stage), and the desired height is a certain number of stages lower than the highest stage (fourth stage, for instance), or in other words, the current blade height is higher than the desired height according to the signal from the height adjustment mechanism 90 for the blade deck 75, the central control unit 50 lowers the height of the blade 70 by one stage (step ST56). At the same time, the central control unit 50 sets the cylinder deactivation flag to "0" (step ST57).

If the signal received from the height adjustment mechanism 90 indicates that the blade 70 has reached the desired height in step ST55, the central control unit 50 stops the downward movement of the blade 70 (step ST58). At the same time, the central control unit 50 sets the cylinder deactivation flag to "0" (step ST59). In each of the cases, the program flow eventually returns to step ST41.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:
1. A lawn mower, comprising:
   a lawn mower main body provided with a propelling device;
   a power source for selectively powering the propelling device;
   a traveling state sensor for detecting a traveling state of the lawn mower;
   an internal combustion engine having a plurality of cylinders and supported by the lawn mower main body;

an engine control unit for performing a cylinder deactivation control including selectively deactivating at least one of the cylinders;

a cutting blade rotatably supported by the lawn mower main body via a cutter deck and connected to the engine in a power transmitting relationship;

a blade clutch provided in a power transmission path between the engine and the cutting blade;

a height adjustment mechanism provided on the cutter deck for adjusting a height of the cutting blade; and a central control unit for controlling an operation of the blade clutch, the height adjustment mechanism and the engine control unit;

wherein the central control unit is configured to determine the cylinder deactivation control is to be performed when the lawn mower travelling forward with the cutting blade at a non-elevated height comes to a stop, and to raise the cutting blade to a prescribed elevated height before performance of the cylinder deactivation control.

2. The lawn mower according to claim 1, wherein the central control unit is configured to maintain the cutting blade at the prescribed elevated height when the lawn mower is commanded to travel rearward or is traveling rearward.

3. The lawn mower according to claim 1, wherein the lawn mower further comprises a steering angle sensor, and the central control unit is configured to deactivate at least one of the cylinders when the lawn mower is traveling forward, and a steering angle greater than a prescribed value is detected.

4. The lawn mower according to claim 3, wherein, when the lawn mower is traveling forward, and a steering angle greater than the prescribed value is detected, the central control unit further raises the cutting blade to a prescribed elevated height and decelerates the lawn mower.

5. The lawn mower according to claim 1, wherein the prescribed elevated height corresponds to a highest possible position of the cutter deck.

* * * * *